US009849555B2

(12) United States Patent
Meissner

(10) Patent No.: US 9,849,555 B2
(45) Date of Patent: Dec. 26, 2017

(54) MACHINE TOOL

(71) Applicant: DR. JOHANNES HEIDENHAIN GmbH, Traunreut (DE)

(72) Inventor: Markus Meissner, Übersee (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 15/332,844

(22) Filed: Oct. 24, 2016

(65) Prior Publication Data

US 2017/0120410 A1  May 4, 2017

(30) Foreign Application Priority Data

Nov. 4, 2015 (DE) .......................... 10 2015 221 599

(51) Int. Cl.
*B23Q 17/24* (2006.01)
*B23C 1/00* (2006.01)
*B23C 1/14* (2006.01)

(52) U.S. Cl.
CPC .......... *B23Q 17/2428* (2013.01); *B23C 1/002* (2013.01); *B23C 1/14* (2013.01); *B23Q 17/2404* (2013.01); *B23C 2260/76* (2013.01)

(58) Field of Classification Search
CPC .. B23Q 17/2428; B23Q 17/2404; B23C 1/14; B23C 2260/76
See application file for complete search history.

(56) References Cited

U.S. PATENT DOCUMENTS 4,714,339 A * 12/1987 Lau ........................ B25J 13/089
356/139.08
5,611,137 A 3/1997 Braun
(Continued)

FOREIGN PATENT DOCUMENTS

DE  10 2011 079 792  1/2012
EP  0 712 683  5/1996
(Continued)

OTHER PUBLICATIONS

European Search Report received in European Application No. EP 16 19 4951, dated Mar. 23, 2017.

*Primary Examiner* — Daniel Howell

(74) *Attorney, Agent, or Firm* — Andrews Kurth Kenyon LLP

(57) ABSTRACT

A machine tool includes a stationary machine frame, a tool head, which is able to be positioned relative to the machine frame along three mutually orthogonal translation axes, and a motor-driven tool. The machine tool includes a swivel unit, which can be pivoted about a horizontal swivel axis relative to the machine frame and includes a workpiece positioning device, via which a workpiece can be rotated about an axis of rotation oriented perpendicularly to the swivel axis. The swivel unit is assigned a measuring frame, which is able to be rotated with the swivel unit and is arranged to be thermally and/or mechanically decoupled from the swivel unit and includes components of a first and second position measuring system. Additional components of the first position measuring system are disposed on the tool head, and further components of the second position measuring system are situated on the workpiece positioning device. The spatial position of the tool head in relation to the measuring frame is ascertained via the first position measuring system, and the spatial position of the workpiece positioning device in relation to the measuring frame takes place via the second position measuring system.

15 Claims, 5 Drawing Sheets

(56) References Cited

U.S. PATENT DOCUMENTS

| | | | | |
|---|---|---|---|---|
| 5,949,685 A * | 9/1999 | Greenwood | ......... | G05B 19/404 356/634 |
| 6,514,018 B2 * | 2/2003 | Martinez | .................. | B23Q 1/70 408/14 |
| 6,995,836 B1 | 2/2006 | Tondorf | | |
| 7,721,398 B2 * | 5/2010 | Bernhard | ............... | B23Q 1/012 198/345.3 |
| 8,116,902 B2 * | 2/2012 | Liu | ........................ | G01B 11/03 356/498 |
| 8,899,889 B2 * | 12/2014 | Yoshida | ............... | B23Q 1/4857 269/55 |
| 9,002,502 B2 * | 4/2015 | Matsushita | .......... | B23Q 1/5406 318/569 |
| 9,002,503 B2 * | 4/2015 | Matsushita | .......... | G05B 19/401 318/646 |
| 2003/0048459 A1 * | 3/2003 | Gooch | ............... | G01B 11/2545 356/620 |
| 2003/0090682 A1 * | 5/2003 | Gooch | ................. | G01B 11/002 356/620 |
| 2003/0120376 A1 * | 6/2003 | Shibata | .................. | G05B 19/41 700/189 |
| 2003/0120377 A1 * | 6/2003 | Hooke | .................... | B23Q 9/00 700/195 |
| 2010/0286813 A1 * | 11/2010 | Yamada | ............. | G05B 19/4163 700/174 |

FOREIGN PATENT DOCUMENTS

| | | |
|---|---|---|
| JP | 2007 044802 | 2/2007 |
| WO | 01/38828 | 5/2001 |

\* cited by examiner

MACHINE TOOL

CROSS-REFERENCE TO RELATED APPLICATIONS

The present application claims priority to Application No. 10 2015 221 599.7, filed in the Federal Republic of Germany on Nov. 4, 2015, which is expressly incorporated herein in its entirety by reference thereto.

FIELD OF THE INVENTION

The present invention relates to a machine tool.

BACKGROUND INFORMATION

European Published Patent Application No. 0 712 683 describes a machine tool that is suitable for the 5-axis machining of workpieces and includes a stationary machine frame as well as a tool head, which can be positioned along three mutually orthogonal translation axes in relation to the machine frame. The tool head includes a motor-driven tool, such as a milling cutter. In addition, a swivel unit is provided, which can be pivoted about a horizontal swivel axis relative to the machine frame; the swivel unit also includes a tool positioning device, via which a workpiece can be rotated about an axis of rotation which is oriented perpendicularly to the swivel axis.

Machine tools having such a configuration, sometimes also referred to as a modified Gantry design, offer excellent precision with regard to the form and positional tolerances that can be achieved on the workpiece under defined conditions. Nevertheless, unavoidable mechanical and/or thermal stresses of the machine tool may lead to deformations on individual components, which are not fully detectable by the position measuring systems integrated into the machine and are thus not fully compensatable. This causes errors in the workpiece to be machined, which means that it will not have the desired dimensions, and that the required form and positional tolerances will not be met.

For machine tools of a different type it is described in German Published Patent Application No. 10 2011 079 792 to address the aforementioned problems by integrating a measuring frame into the machine, which, if possible, cannot be deformed either by mechanical stressing or by thermal influences. In this particular case, the rectangular measuring frame is integrated into the stationary machine part and is made from a material having a low thermal expansion coefficient. Disposed on the measuring frame are components of position measuring systems, via which the position of the machining or spindle head in relation to the measuring frame is determined on the one hand, and the position of the workpiece in relation to the measuring frame is ascertained on the other. This makes it possible to decouple the position determination with regard to the tool and workpiece position from mechanical and thermal influences in the provided machine kinematics, and the aforementioned problems regarding the machine precision are able to be minimized. Because of the scale of a position measuring system which is situated on the underside of the workpiece table and has only a limited spatial extension, the travel range of the table detectable via this position measuring system is limited. Moreover, it is not explained how a suitably configured measuring frame can most usefully be integrated into a machine tool of the type discussed in the introduction that allows the relative positioning of workpiece and tool in five degrees of freedom in space.

SUMMARY

Example embodiments of the present invention providing a machine tool, in which the previously mentioned errors in the position determination are minimized and the most precise ascertainment of the position of the workpiece in relation to the tool may be ensured, for example.

According to an example embodiment of the present invention, a machine tool includes a stationary machine frame and a tool head, which is able to be positioned along three mutually orthogonal translation axes in relation to the machine frame and includes a motor-driven tool. In addition, a swivel unit is provided, which can be pivoted about a horizontal swivel axis relative to the machine frame and is provided with a tool positioning device, via which a workpiece is rotatable about an axis of rotation oriented perpendicularly to the swivel axis. The swivel unit is assigned a measuring frame, which is pivotable with the swivel unit, is adapted to be thermally and/or mechanically decoupled from the swivel unit and situated on the component of a first and second position measuring system. Additional components of the first position measuring system are situated on the tool head, and further components of the second position measuring system are mounted on the workpiece positioning device. The spatial position of the tool head in relation to the measuring frame is ascertained via the first position measuring system, and the spatial position of the workpiece positioning device in relation to the measuring frame takes place via the second position measuring system.

The measuring frame may be integrated into the swivel unit and connected via multiple flexible elements.

The measuring frame may be configured such that the two position measuring systems will not change their pose in relation to each other while the machine tool is in operation.

It is possible to arrange at least a portion of the measuring frame in an L-shape, a first leg of the measuring frame extending in parallel with the swivel axis, and a second leg of the measuring frame extending in parallel with the axis of rotation.

Furthermore, the measuring frame may be arranged so that its thermal zero point is located on the axis of rotation of the workpiece positioning device.

The second position measuring system may include a measuring standard arranged in the form of a drum, and at least three scanning heads for scanning the measuring standard as components. The measuring standard is mounted on the workpiece positioning device, and the longitudinal axis of the drum coincides with the axis of rotation of the workpiece positioning device. The scanning heads are distributed around the drum circumference on the measuring frame.

The measuring standard may be configured as an incident light measuring standard, which includes alternatingly placed scale graduation regions that are provided in the radial and axial direction and feature different optical characteristics; the scanning heads are adapted to optically scan the measuring standard and include at least one light source and a detector device in each case.

As far as the first position measuring system is concerned, it is possible that it includes at least one optical transmitter unit and one optical receiver unit as components. It may be provided that: the transmitter unit is disposed on the tool head and the receiver unit is disposed on the measuring frame; or the transmitter unit is disposed on the measuring frame and the receiver unit is disposed on the tool head; or the transmitter unit and the receiver unit are disposed on the measuring frame and a reflector unit is disposed on the tool head; or the transmitter unit and the receiver unit are disposed on the tool head and a reflector unit is disposed on the measuring frame.

Shielding elements, which shield beam bundles of the first position measuring system that are propagating between the tool head and measuring frame, may be situated between the tool head and the measuring frame.

Furthermore, it is possible that the tool head includes at least one position sensor, by which the position of a motor shaft driving the tool is ascertainable relative to a housing of the tool head on which the components of the first position measuring system are mounted.

The transmitter unit may include at least three light sources, which are disposed at a fixed relative position with respect to each other and which are able to be temporally activated in a selective manner with the aid of a control and evaluation device.

In addition, the receiver unit may include at least one optoelectronic detector system and at least one scanning grating situated upstream from the detector system.

The control and evaluation device may be adapted to ascertain the angular position of the activated light source relative to the detector system using the position of a fringe pattern that results on the detector system, thus allowing the spatial position of the tool to be ascertained following the sequential activation of the at least three light sources.

As an alternative, the first position measuring system may be arranged as an actively or passively tracking interferometer, whose transmitter and receiver units are mounted on the measuring frame, while a reflector unit is situated on the tool head. The reflector unit includes at least one retroreflector, and the transmitter unit includes a tracking mechanism for at least six measuring beam bundles, by which they can be adjusted to the retroreflector.

The retroreflector may function as a measuring reflector in this instance, and a distance between the measuring reflector and a stationary reference reflector is able to be measured via the tracking interferometer, the measuring reflector and the reference reflector being arranged as a sphere in each case.

The measures described herein may ensure an extremely precise ascertainment of the relative position of the tool and workpiece in the corresponding machine tool, which results in much greater machine accuracy and thus an optimized machining of the workpiece. In particular, the measuring frame in the swivel unit provided for this purpose ensures a very short measuring circle. This means that the position determination takes place as directly as possible between workpiece and tool. Complications in the relative position ascertainment of workpiece and tool via additional components can be avoided, so that errors in the position determination resulting from thermal and/or mechanical stressing of the machine tool can thereby be minimized in a reliable manner. Deformations of the machine tool resulting from such effects do not influence the determination of the relative positions of tool and workpiece since the measuring frame in the swivel unit is adapted to be thermally and/or mechanically decoupled from the machine.

Further features and aspects of example embodiments of the present invention are described in more detail below with reference to the appended Figures.

DETAILED DESCRIPTION

Figure 1:
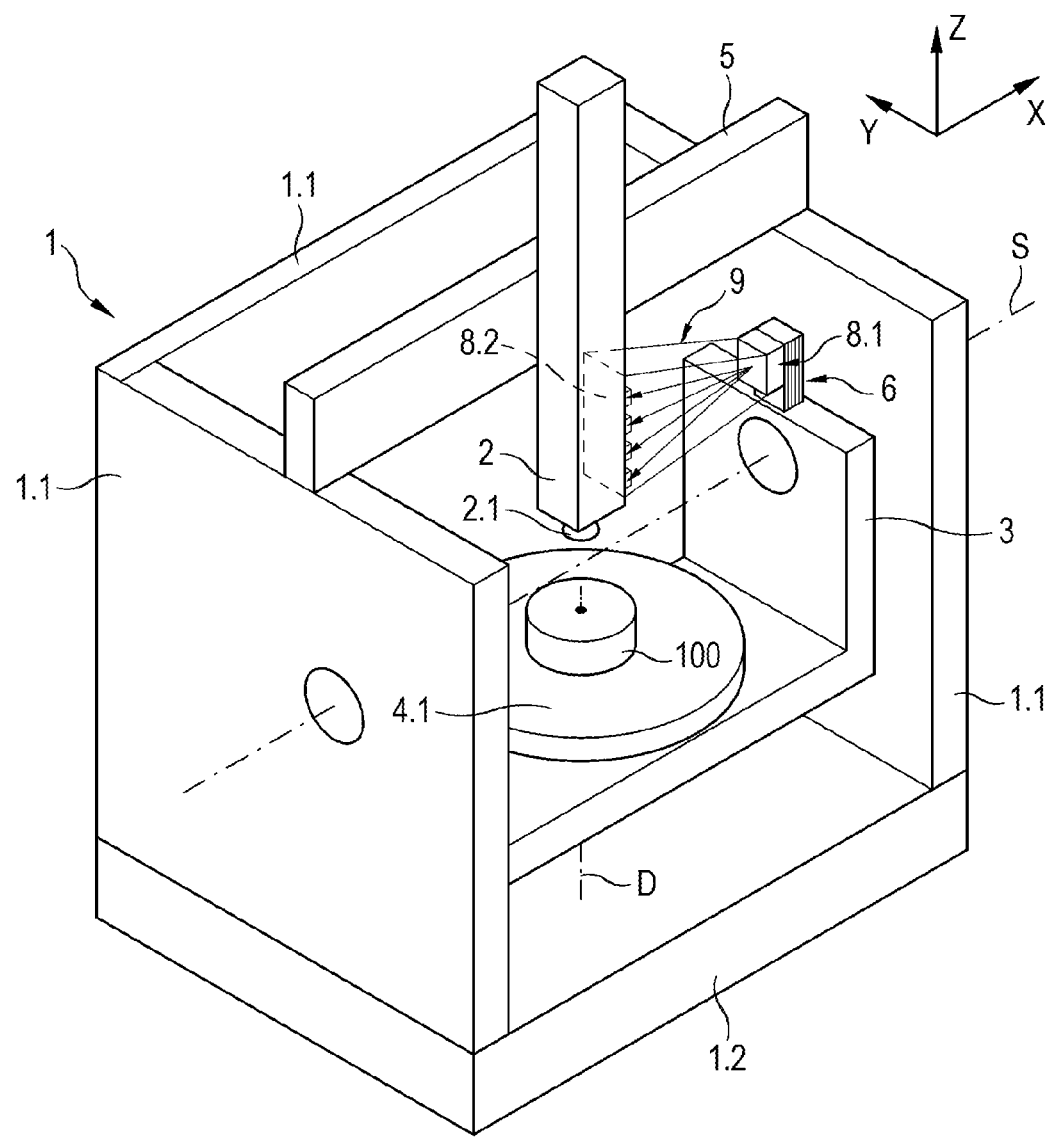
FIG. 1 is a schematic perspective partial view of a machine tool according to an example embodiment of the present invention.
Figure 2:
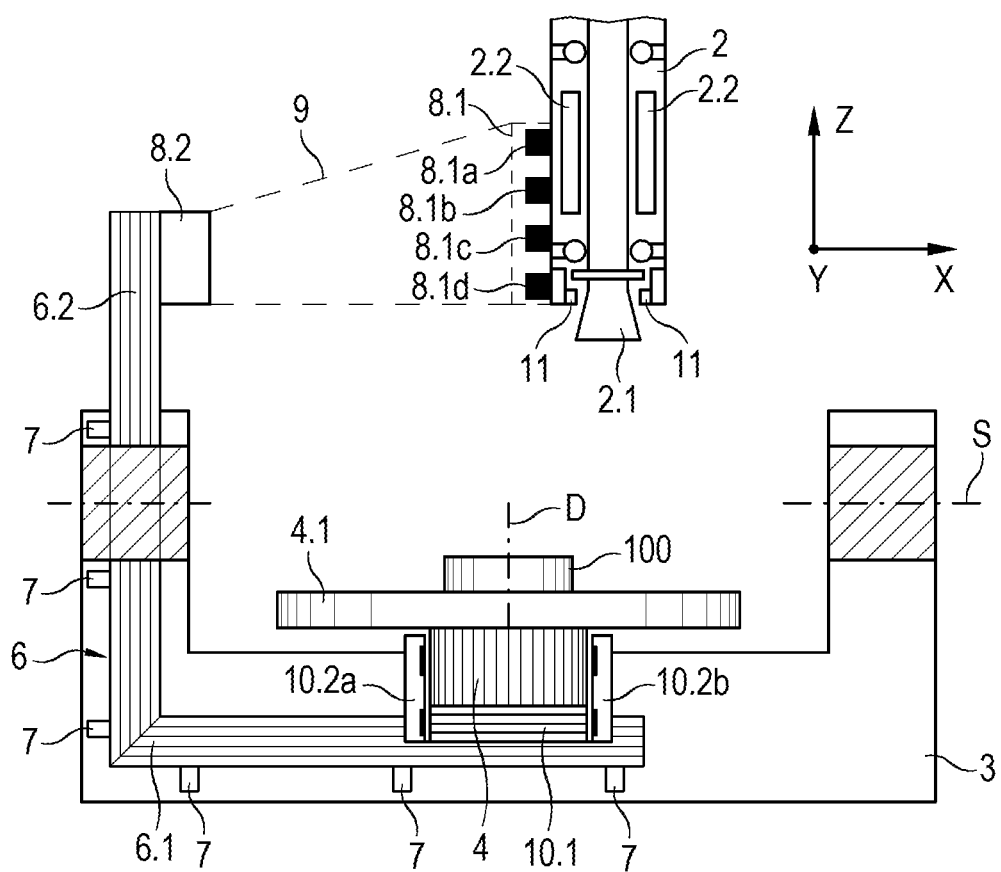
FIG. 2 is a cross-sectional view of the swivel unit of the machine tool illustrated in FIG. 1.
Figure 3:
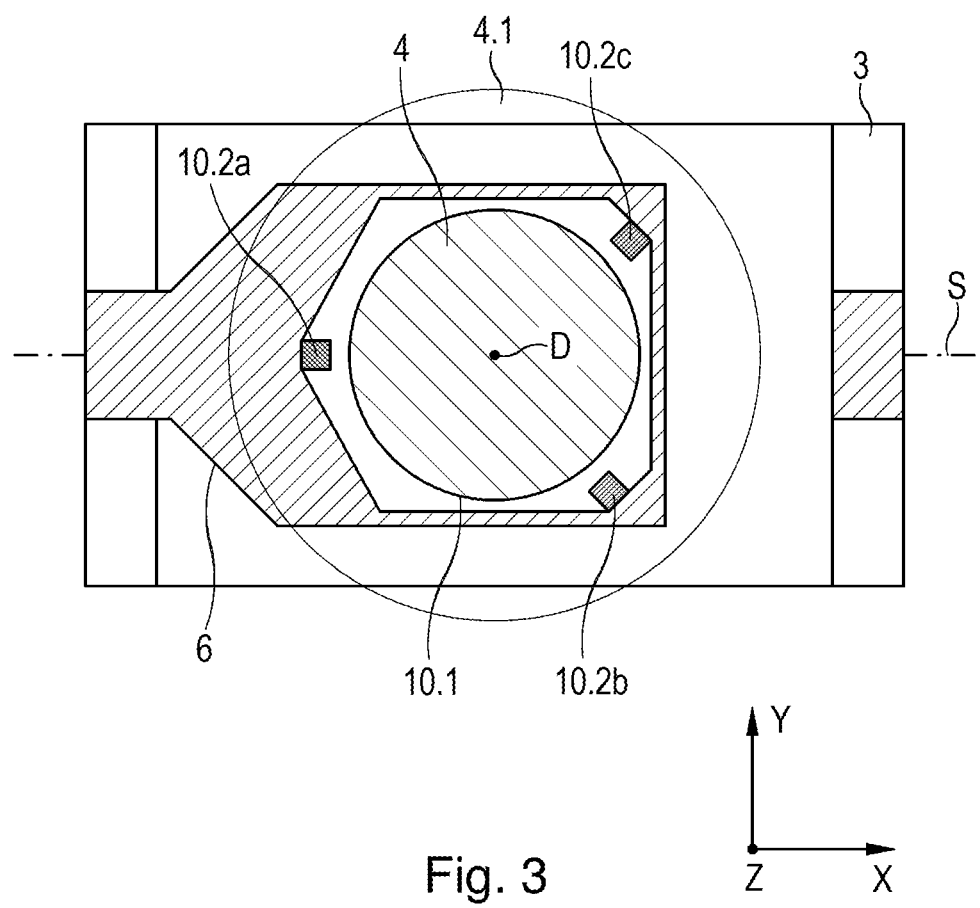
FIG. 3 is a plan view of the swivel unit of the machine tool illustrated in FIG. 1.

FIG. 1 schematically illustrates, in a perspective partial view, a machine tool according to an example embodiment of the present invention. FIG. 2 is a lateral cross-sectional view of a swivel unit of the machine tool, and FIG. 3 is a plan view of the swivel unit.

The machine tool includes a stationary machine frame 1, in relation to which a tool head 2 in the form of a tool spindle is able to be relatively positioned along three translation axes x, y, z that have an orthogonal orientation with respect to each other. Only a lower base region 1.2 and three upwardly extending side walls 1.1 of machine frame 1 are illustrated in FIG. 1. The actual working region of the machine tool, where the milling of a workpiece 100 is carried out, is located between side walls 1.1. Tool head 2 includes a tool 2.1, such as a milling tool, for this purpose, which is mounted on an end of a rotating motor shaft that is driven via a suitable drive 2.2, as illustrated in FIG. 2.

To provide the movement of tool head 2 along a vertical translation axis z and a first horizontal translation axis x, tool head 2 is to be positioned on a crossmember 5 with the aid of suitable longitudinal guides to allow horizontal positioning in the x-direction and vertical positioning in the z-direction, the crossmember extending along the indicated x-axis. The movement of tool head 2 along a second horizontal translation axis y is provided by mounting crossmember 5, via longitudinal guides, on machine frame 1 or on the two side walls 1.1 lying opposite each other, in a manner that allows movement along the y-direction.

Moreover, a swivel unit 3 is provided in the machine tool, which is pivotable relative to machine frame 1 about a horizontal swivel axis S that is oriented in parallel with first horizontal translation axis x. Bearings are provided in side walls 1.1 of machine frame 1, in which swivel unit 3 is situated in a manner that allows it to pivot about swivel axis S with the aid of a drive.

Swivel unit 3 furthermore includes a workpiece positioning device 4, which is arranged as a motor-driven round table, via which a workpiece 100 is rotatable about an axis of rotation D oriented perpendicularly to swivel axis S. Conventional clamping device fix workpiece 100 on a table 4.1 of workpiece positioning device 4. The complete unit of swivel unit 3 and workpiece positioning device 4 is also referred to as NC rotary table.

In the machine tool described herein, it is provided to assign a measuring frame 6 to swivel unit 3 or to integrate it therein, as can be seen from the schematized cross-sectional view of swivel unit 3 in FIG. 2, in particular. Because of such an allocation of measuring frame 6 to swivel unit 3, the former is pivotable about swivel axis S together with swivel unit 3. In this exemplary embodiment, measuring frame 6 is furthermore arranged to be thermally and mechanically decoupled from swivel unit 3. In other words, to the extent possible, measuring frame 6 will not be deformed by temperature fluctuations and milling forces arising in the machine, but retain its setpoint geometry even during the milling operation. As far as details of an appropriate configuration of measuring frame 6 are concerned, reference is made to the following description.

The spatial position of tool head 2, and thus of tool 2.1, in relation to measuring frame 6 is ascertained via a first position measuring system on the one hand, and the spatial position of workpiece positioning device 4, and thus of workpiece 100, in relation to measuring frame 6, is determined via a second position measuring system on the other. For this purpose certain components of the first and second position measuring systems are disposed on measuring frame 6, and other components of the first and second position measuring systems are situated on tool head 2 and on workpiece positioning device 4. Here, too, reference is made to the further description as far as the possible arrangement of the first and second position measuring systems as well as details thereof are concerned.

Ascertaining the spatial position of tool head 2 or workpiece positioning device 4 relative to measuring frame 6 thus results in a short-circuited measuring circle with regard to the ascertainment of the relative position of tool 2.1 and workpiece 100. The initially discussed thermal and/or mechanical influences on the position ascertainment are able to be minimized to a considerable extent in this manner, and substantially better machine precision is obtained, and thus better workpiece quality.

In the present exemplary embodiment, measuring frame 6 is arranged in an L-shape and has a first leg 6.1, which extends outwardly from central axis of rotation D and extends parallel to swivel axis S. A second leg 6.2 of measuring frame 6 is provided perpendicularly to first leg 6.1 and extends from the outer end of first leg 6.1 at a right angle in the upward direction and thus extends parallel to axis of rotation D according to FIG. 2.

In the exemplary embodiment illustrated, measuring frame 6 is thermally as well as mechanically decoupled from swivel unit 3 and has the stiffest configuration possible. In addition, it is ensured that no temperature effects and also no mechanical stresses from machine frame 1 come to bear on measuring frame 6 and possibly cause deformation thereon. As a result, the position ascertainment of workpiece 100 and tool 2.1 in relation to measuring frame 6 that is performed via the two position measuring systems in the machine tool is independent of these influences. The spacing of the components of these position measuring systems on the side of the measuring frame is changed neither by thermal nor mechanical effects. The configuration of the measuring frame thus ensures that the pose of the two position measuring systems relative to each other does not vary when the machine tool is in operation.

For the thermal decoupling, measuring frame 6 is made from a material that has the lowest thermal expansion coefficient possible. Suitable, for example, are Invar or else also special carbon materials having a very low coefficient of thermal expansion. As an alternative to such a material selection, it is also possible to PROVIDE an active thermal compensation for thermally decoupling the measuring frame from the rest of the machine tool, such as in the form of a measuring frame 6 made from tempered aluminum, the tempering being accomplished via suitable water cooling of the aluminum material.

With regard to the mechanical decoupling, the illustrated exemplary embodiment provides for an integration of measuring frame 6 into swivel unit 3 by multiple flexible elements 7. FIG. 2 schematically illustrates a series of flexible elements 7 of this type located between measuring frame 6 and swivel unit 3.

Flexible elements 7 may include, for example, are so-called 1D-, 2D- or 3D-solid joints (or living hinges) or combinations thereof, via which measuring frame 6 is connected to swivel unit 3. 1D-solid joints, which enable a limited relative deflection of measuring frame 6 and swivel unit 3 along a single direction of movement, may be provided from multiple elastic connecting elements between measuring frame 6 and swivel unit 3. 2D-solid joints may include two or more intermediate elements connected in series, which are linked to each other and also to measuring frame 6 and swivel unit 3 via multiple elastic connecting elements. In addition, a limited relative deflection of measuring frame 6 and swivel unit 3 is possible along two mutually orthogonal directions of movement. Employing 3D-solid joints, it is also possible to provide a relative deflection of measuring frame 6 and swivel unit 3 along three axes that are orthogonal to each other, for which at least two intermediate elements connected in series may be used, a relative movement along a third axis being possible at least between one of the two intermediate elements and the adjoining component.

Figure 4A:
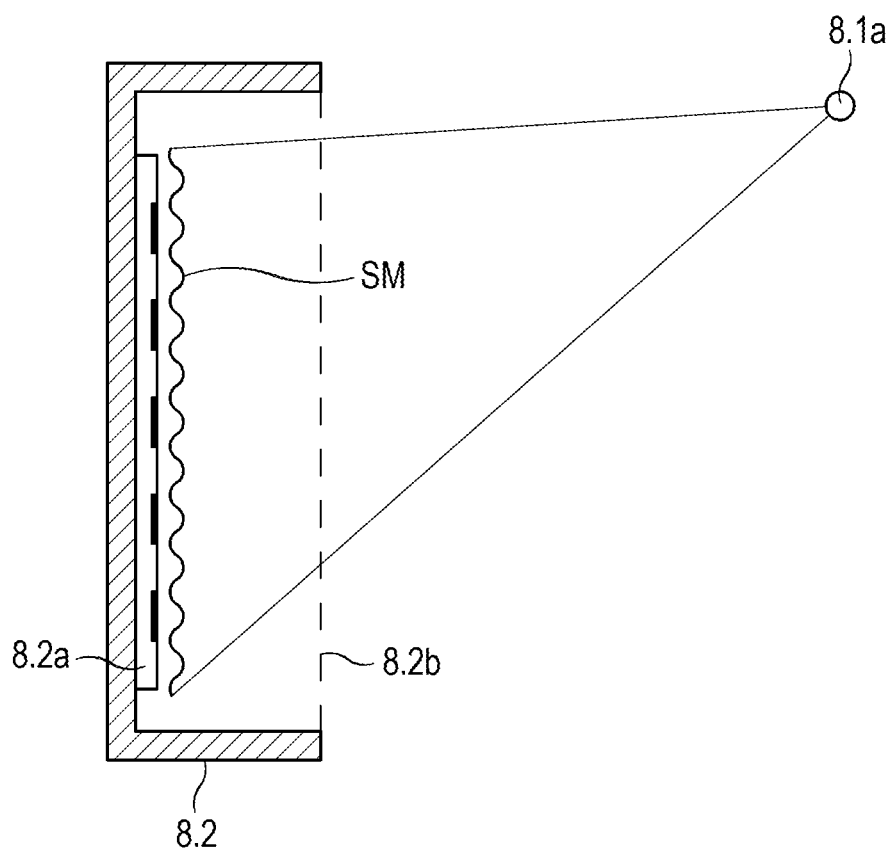
FIG. 4a is a schematic view of a first position measuring system.

In the exemplary embodiment illustrated, an optical position measuring system is provided as a first position measuring system for ascertaining the spatial position of tool head 2 in relation to measuring frame 6. It includes a transmitter unit 8.1 disposed on tool head 2, and a receiver unit 8.2 situated on measuring frame 6. The optical position measuring system is arranged as a spatial 2D-angle measuring system, as described, for example, in PCT International Published Patent Application No. WO 01/38828, which is expressly incorporated herein in its entirety by reference thereto. The corresponding 2D-angle measuring system in the present exemplary embodiment includes four light sources 8.1a to 8.2d on the transmitter side, which are arranged as LEDs, for example, and are able to be activated in a temporally selective manner via a control and evaluation device. It should be mentioned that only a minimum of at least three light sources would basically be required at this location from the aspect of metrology. On the side of receiver unit 8.2, an optoelectronic detector system 8.2a having an upstream scanning grating 8.2b is provided, as illustrated in FIG. 4a, which shows a single light source 8.1a in connection with detector system 8.2. A so-called structured photodetector element, which includes a multitude of periodically placed light-sensitive detector elements, functions as detector system 8.2a in this case. Using the structured photodetector element, a periodic fringe pattern SM is detected, which comes about in the detection plane and results from the reciprocal action between the light beams emitted by light sources 8.1a to 8.1d and scanning grating 8.2b. The position of this fringe pattern SM on the photodetector element depends on the angular position of the individual light source 8.1a to 8.1d in relation to detector system 8.2. As far as further details of the optical operating principle of the first position measuring system are concerned, reference is made to the previously mentioned PCT International Application No. WO 01/38828.

The 2D-angle measuring system of the first position measuring system therefore makes it possible to ascertain the individual angle between a light source 8.1a to 8.1d of transmitter unit 8.1 and a normal to detector system 8.2 with the aid of the control and evaluation device. To determine the position, the control and evaluation device sequentially activates the individual light sources 8.1a to 8.1d during the measuring operation, and the directional vector between receiver unit 8.2 and individual light source 8.1a to 8.1d is determined for each individual light source 8.1a to 8.1d.

Since the position or the placement of the various light sources 8.1a to 8.1d in relation to each other is known, the pose or spatial position of the individual light sources 8.1a to 8.1d is able to be determined in this manner. Because of the placement of transmitter unit 8.1 or light sources 8.1a to 8.1d on tool head 2, it is possible to ascertain the spatial position of tool head 2, and thus of tool 2.1, in relation to measuring frame 6 in this manner.

To allow the most precise determination of the position of tool 2.1 in tool head 2, it may furthermore be the case that one or more position sensor(s) 11 is/are disposed in tool head 2, via which the current spatial position of tool 2.1 in relation to the housing of tool head 2 can be determined. For example, capacitive distance sensors may be used as suitable position sensors 11 for this purpose. Via such sensors, the position of the motor shaft driving tool 2.1 in relation to the housing of tool head 2, where the components of the first position measuring system are in turn situated, is then able to be ascertained, in this case, transmitter unit 8.1 with associated light sources 8.1a to 8.1d.

Since the measurement with the aid of the first position measuring system takes place in the working chamber of the machine tool, it may be provided that the beam bundles propagating between transmitter unit 8.1 and receiver unit 8.2 are shielded by one or possibly several shielding element(s) 9. Shielding element 9, which is only illustrated schematically, is, for example, arranged as an opaque beam pipe, which is passively carried along with tool head 2. The beam pipe completely surrounds the propagating beam bundles between tool head 2 and measuring frame 6 and prevents locally present coolant lubricants and shavings from interfering with the beam bundles. As an alternative to such a beam pipe that completely encapsulates the beam bundles, it is also possible to provide as shielding element simply an opaque shielding plate, etc., which physically surrounds or shields the propagating beam bundles only partially.

Figure 4B:
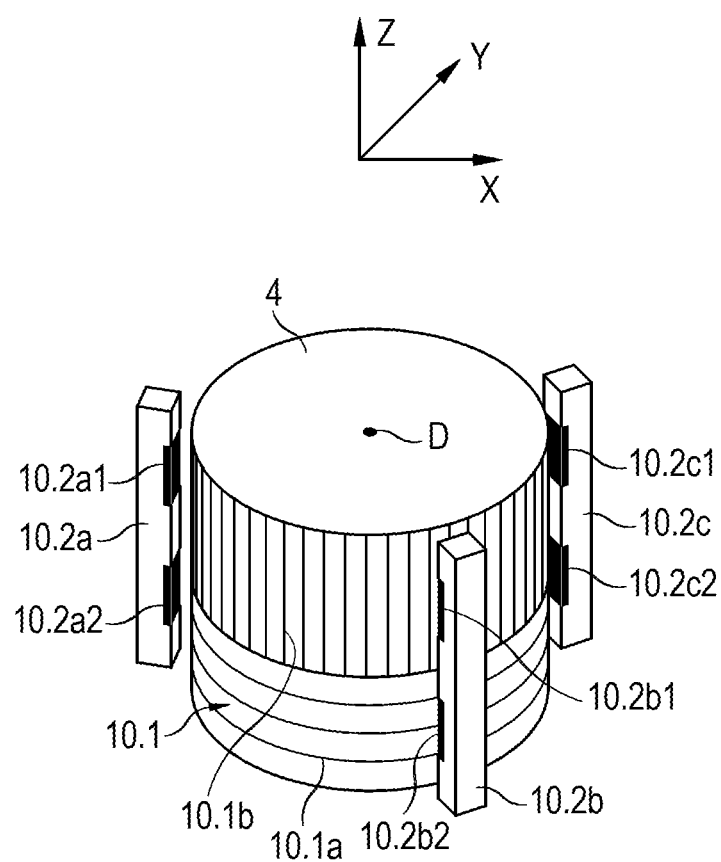
FIG. 4b is a schematic view of a second position measuring system.

As mentioned previously, the second position measuring system is used for ascertaining the spatial position of workpiece positioning device 4, and thus of workpiece 100, in relation to measuring frame 6. In the present exemplary embodiment, it is arranged as an optical 6D-angle measuring device and will be described in the following text on the basis of the schematic illustration of FIG. 4b.

The second position measuring device includes, for example, a drum-shaped measuring standard 10.1, which is arranged on workpiece positioning device 4 that rotates about axis of rotation D. The longitudinal axis of the drum coincides with axis of rotation D of workpiece positioning device 4. In this exemplary embodiment, measuring standard 10.1 is located on the circumference of the cylindrical lower part of the rotary table, e.g., underneath table 4.1 on which workpiece 100 is clamped. Measuring standard 10.1 is implemented as an incident light measuring standard in the form of an amplitude grating and includes alternately placed scale graduation regions featuring different reflectivities. On the side of measuring standard 10.1, the scale graduation regions are periodically placed in the axial direction, e.g., along the indicated z-direction, in a first region 10.1a, and in a second region 10.1b, the scale graduation regions are sequentially arranged in a periodic pattern in the radial direction, e.g., in the circumferential direction. However, it is also possible to use other configurations for the scanned measuring standard and provide scale graduation regions having different optical properties and being disposed in alternation, e.g., as phase grating which have scale graduation regions providing a different phase-shifting effect, etc.

The second position measuring system may include as further components three scanning units, 10.2a, 10.2b, 10.2c, which are fixedly disposed on measuring frame 6 in relation to rotating measuring standard 10.1 and are used for the optical scanning of measuring standard 10.1. The three scanning units 10.2a, 10.2b, 10.2c are situated across the circumference at a 120° offset from each other. Because of the previously described arrangement of measuring standard 10.1, two scanning heads 10.2a1 and 10.2a2 or 10.2b1 and 10.2b2 as well as 10.2c1 and 10.2c2 are provided per scanning unit 10.2a, 10.2b, 10.2c, which are used for scanning a region 10.1a, 10.1b on measuring standard 10.1. Thus, a total of six scanning heads 10.2a1, 10.2a2, 10.2b1, 10.2b2, 10.2c1, 10.2c2 are provided.

As an alternative to the illustrated exemplary embodiment of the second position measuring system, at least three scanning heads, which are distributed on the measuring frame around the drum circumference, would be required in a minimum configuration in order to scan the measuring standard.

The individual scanning heads 10.2a1, 10.2a2, 10.2b1, 10.2b2, 10.2c1, 10.2c2 of the illustrated exemplary embodiment also include at least one detector device in addition to a light source. Various types of conventional optical scanning principles may be used for the optical scanning of measuring standard 10.1, which is why no further discussion is necessary in this regard. The two scanning heads 10.2a1 and 10.2a2, 10.2b1 and 10.2b2 or 10.2c1 and 10.2c2 allocated to one scanning unit 10.2a, 10.2b, 10.2c in each case are situated at a 90° offset from each other in order to scan the associated region 10.1a, 10.1b of measuring standard 10.1.

Using the second position measuring device arranged in this manner makes it possible to ascertain the spatial position of the rotary table or workpiece positioning device 4, and thus of workpiece 100 disposed thereon, in relation to measuring frame 6 in all six spatial degrees of freedom.

With regard to the relative placement of the second position measuring system or its component and measuring frame 6, it may be provided that the thermal zero point of measuring frame 6 is located in the center of the component of the second position measuring device on the side of the measuring frame. For example, the thermal zero point of measuring frame 6 is located on axis of rotation D of workpiece positioning device 4. The particular point of measuring frame 6 that remains spatially invariant and does not shift even when exposed to thermal influences, should be understood to denote the thermal zero point.

In addition to the foregoing, it is possible to arrange the measuring frame alternatively to the above-described L-shape. For example, a U-shaped measuring frame adapted to the shape of the swivel unit may be provided. This allows a symmetrical integration of the measuring frame into the swivel unit, which in particular would result in a more even weight distribution in the swivel unit.

It is also possible to decouple the measuring frame from the swivel unit only thermally, for example, or else only mechanically if mechanical or thermal influences are not particularly serious in a certain machine configuration.

Additionally, he measuring frame may be not integrated into the swivel unit, but rather sit on top of it.

It is also possible to place the transmitter unit on the measuring frame and the receiver unit on the tool head. Also possible is a placement of the transmitter unit as well as the receiver unit on the measuring frame and a placement of a passive reflector unit on the tool head, or vice versa. In such a case, the reflector unit is adapted to provide a back reflection of the beam bundles impinging thereon from the transmitter unit back in the direction of the receiver unit.

The first position measuring system may be arranged as a tracking interferometer, whose transmitter and receiver units are situated on the measuring frame, while a reflector unit is disposed on the tool head. In this case, the reflector unit includes at least one retroreflector, and the transmitter unit includes a tracking mechanism for at least six measuring beam bundles, by which they may be adjusted to the retroreflector. The tracking mechanism may be arranged both as an active tracking mechanism having suitable drives or else as passive tracking mechanism having a linkage, etc.

In an example embodiment that includes a tracking interferometer, the retroreflector is used as a measuring reflector, and the respective distance between the measuring reflector and a stationary reference reflector is measurable with the aid of the interferometer. Both the measuring reflector and the reference reflector may be arranged as spheres and may be made from a material having a refractive index of n=2, etc.

Moreover, instead of the described optical scanning in a 6D-angle measuring device, a different scanning principle may be used, such as magnetic, inductive, or capacitive scanning, etc.

What is claimed is:

1. A machine tool, comprising
a stationary machine frame;
a tool head positionable relative to the machine frame along three translation axes oriented orthogonally with respect to each other, the tool head including a motor-driven tool;
a swivel unit pivotable about a horizontal swivel axis relative to the machine frame and including a workpiece positioning device adapted to rotate a workpiece about an axis of rotation oriented perpendicularly to the swivel axis;
a first measuring system;
a second measuring system; and
a measuring frame assigned to the swivel unit, the measuring frame rotatable with the swivel unit and thermally and/or mechanically decoupled from the swivel unit, components of the first measuring system and the second measuring system being provided on the measuring frame;
wherein additional components of the first position measuring system are arranged on the tool head, and further components of the second position measuring system are provided on the workpiece positioning device;
wherein the first position measuring system is adapted to measure a spatial position of the tool head relative to the measuring frame; and
wherein the second position measuring system is adapted to measure a spatial position of the workpiece positioning device relative to the measuring frame.

2. The machine tool according to claim 1, wherein the measuring frame is integrated into the swivel unit and connected via multiple flexible elements.

3. The machine tool according to claim 1, wherein the measuring frame is arranged such that a pose of the first and second position measuring systems with respect to each other does not change during operation of the machine tool.

4. The machine tool according to claim 1, wherein at least a portion of the measuring frame is arranged in an L-shape, a first leg of the measuring frame extending in parallel with the swivel axis and a second leg of the measuring frame extending in parallel with the axis of rotation.

5. The machine tool according to claim 1, wherein a thermal zero point of the measuring frame is located on the axis of rotation of the workpiece positioning device.

6. The machine tool according to claim 1, wherein the second position measuring system includes a drum-shaped measuring standard and at least three scanning heads adapted to scan the measuring standard;
wherein the measuring standard is arranged on the workpiece positioning device, a longitudinal axis of the drum coinciding with the axis of rotation of the workpiece positioning device; and
wherein the scanning heads are arranged on the measuring frame distributed around a circumference of the drum.

7. The machine tool according to claim 6, wherein the measuring standard is arranged as an incident light measuring standard that includes alternate scale graduation regions in radial and axial directions having different optical characteristics; and
wherein the scanning heads are adapted to optically scan the measuring standard, each scanning head including at least one light source and a detector device.

8. The machine tool according to claim 1, wherein the first position measuring system includes at least one optical transmitter unit and an optical receiver unit; and
wherein (a) the transmitter unit is arranged on the tool head and the receiver unit is arranged on the measuring frame, or (b) the transmitter unit is arranged on the measuring frame and the receiver unit is arranged on the tool head, or (c) the transmitter unit and the receiver unit are arranged on the measuring frame and a reflector unit is arranged on the tool head, or (d) the transmitter unit and the receiver unit are arranged on the tool head and a reflector unit is arranged on the measuring frame.

9. The machine tool according to claim 8, further comprising shielding elements arranged between the tool head and the measuring frame, the shielding elements adapted to shield beam bundles from the first position measuring system propagating between the tool head and the measuring frame.

10. The machine tool according to claim 8, wherein the tool head includes at least one position sensor adapted to ascertain a position of a motor shaft driving the tool relative to a housing of the tool head on which the components of the first position measuring system are arranged.

11. The machine tool according to claim 8, wherein the transmitter unit includes at least three light sources arranged in a fixed relative position relative to each other and temporally activatable in a selective manner by a control and evaluation device.

12. The machine tool according to claim 11, wherein the receiver unit includes at least one optoelectronic detector system and at least one scanning grating arranged upstream from the detector system.

13. The machine tool according to claim 12, wherein the control and evaluation device is adapted to ascertain an angular position of an activated light source relative to the detector system based on a position of a fringe pattern that results on the detector system, so that a spatial position of the tool is ascertainable following a sequential activation of the at least three light sources.

14. The machine tool according to claim 8, wherein the first position measuring system includes an actively or passively tracking interferometer, having transmitter and receiver units arranged on the measuring frame and a reflector unit arranged on the tool head, the reflector unit including at least one retroreflector, and the transmitter unit including a tracking mechanism for at least six measuring beam bundles adapted to adjust the beam bundles to the retroreflector.

15. The machine tool according to claim 14, wherein the retroreflector is arranged as a measuring reflector, the interferometer adapted to measure a distance between the measuring reflector and a stationary reference reflector, the measuring reflector and the reference reflector being spherical.

* * * * *